(12) United States Patent
Phillips et al.

(10) Patent No.: US 11,954,680 B2
(45) Date of Patent: Apr. 9, 2024

(54) DEVICES, METHODS AND COMPUTER READABLE MEDIUMS FOR PROVIDING ACCESS CONTROL

(71) Applicant: Mastercard International Incorporated, Purchase, NY (US)

(72) Inventors: Simon Phillips, York (GB); Alan Johnson, Maldon (GB); Michael John Cowen, London (GB)

(73) Assignee: Mastercard International Incorporated, Purchase, NY (US)

( * ) Notice: Subject to any disclaimer, the term of this patent is extended or adjusted under 35 U.S.C. 154(b) by 46 days.

(21) Appl. No.: 17/079,382

(22) Filed: Oct. 23, 2020

(65) Prior Publication Data

US 2022/0129894 A1    Apr. 28, 2022

(51) Int. Cl.
| | |
|---|---|
| *G06Q 20/40* | (2012.01) |
| *G07B 15/00* | (2011.01) |
| *G07C 9/00* | (2020.01) |
| *G07C 9/10* | (2020.01) |
| *G07C 9/25* | (2020.01) |
| *G07C 9/27* | (2020.01) |

(52) U.S. Cl.
CPC .......... *G06Q 20/401* (2013.01); *G07B 15/00* (2013.01); *G07C 9/00309* (2013.01); *G07C 9/00563* (2013.01); *G07C 9/00571* (2013.01); *G07C 9/00904* (2013.01); *G07C 9/10* (2020.01); *G07C 9/25* (2020.01); *G07C 9/27* (2020.01)

(58) Field of Classification Search
CPC .......... G06Q 20/401; G07C 9/27; G07C 9/25; G07C 9/10; G07C 9/00309; G07C 9/00563; G07C 9/00571; G07C 9/00904
See application file for complete search history.

(56) References Cited

U.S. PATENT DOCUMENTS

| | | | |
|---|---|---|---|
| 5,596,501 A | 1/1997 | Comer et al. | |
| 7,096,494 B1 | 8/2006 | Chen | |
| 8,086,533 B1 | 12/2011 | Maglaque et al. | |
| 11,398,123 B1* | 7/2022 | Mars | G07C 9/21 |
| 2006/0016878 A1 | 1/2006 | Singer et al. | |
| 2012/0330839 A1 | 12/2012 | Kavanagh et al. | |
| 2013/0304648 A1* | 11/2013 | O'Connell | G07C 9/10 |
| | | | 705/44 |
| 2014/0115694 A1 | 4/2014 | Fadell et al. | |
| 2015/0012434 A1* | 1/2015 | Aabye | G06Q 20/3821 |
| | | | 705/44 |
| 2015/0282261 A1 | 10/2015 | Recker et al. | |
| 2015/0348043 A1* | 12/2015 | Leger | G06Q 20/4014 |
| | | | 705/44 |

(Continued)

OTHER PUBLICATIONS

International Search Report and Written Opinion, PCT/US2021/053879, dated Dec. 16, 2021, pp. 1-8.

*Primary Examiner* — Nabil H Syed
(74) *Attorney, Agent, or Firm* — Pramudji Law Group PLLC; Ari Pramudji (57) ABSTRACT

Various implementation described herein are directed to a method for providing access control. User information is received at a device. A request to provide access control is generated by the device based on the received user information. The request is transmitted via a network to an access manager. A response to the request is received from the access manager. Access control via the device is provided based on the response to the request.

10 Claims, 10 Drawing Sheets

(56) References Cited

U.S. PATENT DOCUMENTS

| | | | |
|---|---|---|---|
| 2016/0155279 A1* | 6/2016 | Thomas | G06Q 10/0631 340/5.52 |
| 2016/0358175 A1 | 12/2016 | Weller et al. | |
| 2017/0140347 A1 | 5/2017 | Berman et al. | |
| 2018/0033227 A1* | 2/2018 | Gokcebay | G07C 9/00896 |
| 2018/0211462 A1* | 7/2018 | Wendling | G07C 9/00309 |
| 2018/0232716 A1 | 8/2018 | Conforti | |
| 2020/0286077 A1 | 9/2020 | Berman et al. | |
| 2021/0359856 A1* | 11/2021 | Shankar | G06Q 20/36 |
| 2021/0398123 A1* | 12/2021 | Snehasri | G07C 9/00309 |

\* cited by examiner

DEVICES, METHODS AND COMPUTER READABLE MEDIUMS FOR PROVIDING ACCESS CONTROL

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Electronic access control is an expanding market that may lead to physical point of sale (POS) terminals becoming obsolete in the coming years. In order to remain relevant, present POS terminals and accompanying networks should be updated to take advantage of opportunities and diversify service offerings in the electronic access control paradigm.

SUMMARY

Described herein are various implementations of a method for providing access control. In one implementation, user information is received at a device. A request to provide access control and/or payment is generated by the device based on the received user information. The request is transmitted via a network to an access manager. A response to the request is received from the access manager. Access control via the device is provided based on the response to the request.

In one implementation, the request may be a payment authorization request. In one implementation, the request may be a zero value or low value payment authorization request.

The user information may include one or more of: cardholder information received from a payment card, cardholder information received from a mobile device, and/or biometric information associated with a cardholder.

In one implementation, providing access control may include locking and/or unlocking a barrier. In one implementation, the device includes a lock coupled to the barrier. In one implementation, the barrier may be a door or a gate.

In one implementation, providing access control may include opening and/or closing a barrier.

Described herein are various implementations of an access device. In one implementation, the access device includes: at least one processor and at least one memory including computer program code. The at least one memory and the computer program code may be configured to, with the at least one processor, cause the access device at least to: receive user information at a device; initiate a request for the device to provide access control based on the user information; transmit the request via a network to an access manager; receive a response to the request from the access manager; provide access control via the device based on the response to the request.

In one implementation, the request may be a payment authorization request. In one implementation, the payment authorization request can be a zero value or low value payment authorization request.

In one implementation, the access device includes a passive infrared sensor or other detection sensor enabling the access device to conserve power, e.g., by operating in low power mode until such time as a person is detected in a vicinity of the access device.

Described herein are various implementations of a system including an access manager. In one implementation, the access manager includes: at least one processor and at least one memory including computer program code. The at least one memory and the computer program code may be configured to, with the at least one processor, cause the access manager at least to: receive, via a network, a payment authorization request from an access device to provide access control based on user information; perform a lookup process based on the payment authorization request; determine eligibility for access based on the user information in the payment authorization request; forward the payment authorization request to an acquirer for eligible user information based on the determined eligibility; receive a response to the payment authorization request from the acquirer; and transmit, via the network, the response to the payment authorization request to the access device.

In one implementation, the payment authorization request can be a zero value or low value payment authorization request.

In one implementation, the response may be one of: a payment authorization response approving access, a payment authorization response restricting access, and another message.

In one implementation, the access manager denies access for user information that is determined to be ineligible.

In one implementation, the system includes the access manager, the access device and an acquirer; and the acquirer: receives the payment authorization request from the access manager; performs a payment authorization process based on the payment authorization request; generates a response to the payment authorization request; and transmits the response to the payment authorization request to the access manager.

In one implementation, the system includes the access manager, the access device, an acquirer and a payment processing entity. The payment processing entity: receives the payment authorization request from the access manager via the acquirer; performs a payment authorization process based on the payment authorization request; generates a response to the payment authorization request; and transmits the response to the payment authorization request to the access manager via the acquirer.

In one implementation, the system includes the access manager, the access device, an acquirer, a payment processing entity and an issuer entity. The issuer entity: receives the payment authorization request from the access manager via the acquirer and the payment processing entity; performs a payment authorization process based on the payment authorization request; generates a response to the payment authorization request; and transmits the response to the payment authorization request to the access manager via the payment processing entity and the acquirer.

Described herein are various implementations of a system including an access device. In one implementation, the access device includes at least one processor and at least one memory including computer program code. The at least one memory and the computer program code may be configured to, with the at least one processor, cause the access device at least to: generate a payment authorization request to provide access control based on received user information; perform a lookup process based on the payment authorization request; determine eligibility for access based on the user information in the payment authorization request; perform a payment authorization process based on the payment authorization request; generate a response to the payment authorization request; and provide access control based on the response to the payment authorization request.

Described herein are various implementations of a system including an access control panel. In one implementation, the access control panel includes at least one processor and at least one memory including computer program code. The at least one memory and the computer program code may be configured to, with the at least one processor, cause the access control panel at least to: receive a full or partial copy of a database of a central access manager; receive a payment authorization request from an access device; and locally provide access based on user information provided in the payment authorization request and information provided in the received full or partial copy of the database.

The above referenced summary section is provided to introduce a selection of concepts in a simplified form that are further described below in the detailed description section. Additional concepts and various other implementations are also described in the detailed description. The summary is not intended to identify key{XE "Narrowing designation: key" } features or essential{XE "Narrowing designation: essential" } features of the claimed subject matter, nor is it intended to be used to limit the scope of the claimed subject matter, nor is it intended to limit the number of inventions described herein. Furthermore, the claimed subject matter is not limited to implementations that solve any or all{XE "Narrowing designation: all" } disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only{XE "Narrowing designation: only" } the various implementations described herein and are not meant to limit the scope of various techniques described herein.

DETAILED DESCRIPTION

Electronic access control can be provided by taking advantage of various existing relationships, hardware and/or networks that may include: an existing payment payment processing entity network, a trusted issuer—cardholder relationship, digital security, Device Primary Account Number (DPAN) present in phones/watches, contactless reader and/or merchant terminal hardware. Generally, DPAN's may be referred to as payment tokens.

Figure 1:
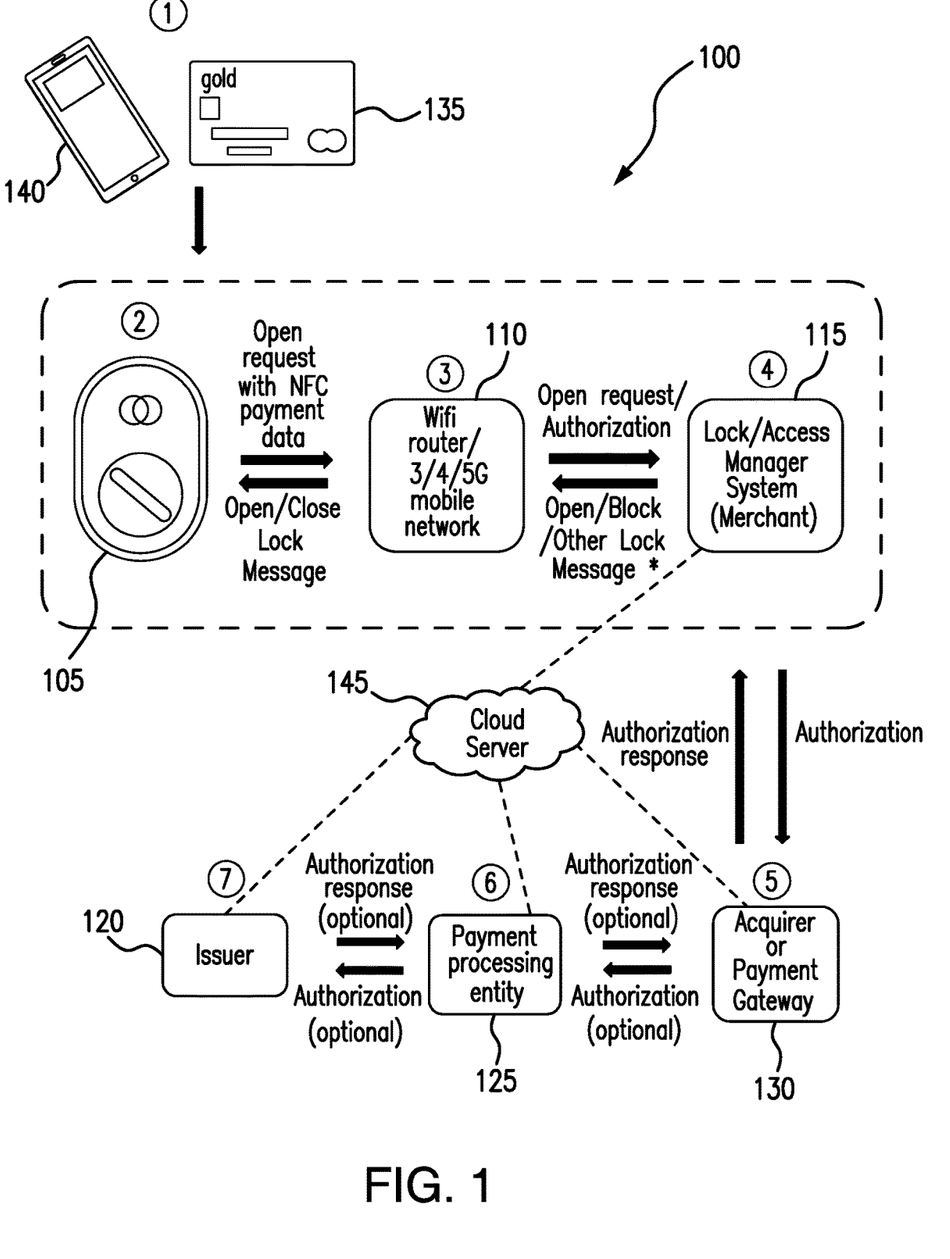
FIG. 1 illustrates an access control system in accordance with implementations of various techniques described herein.

FIG. 1 illustrates an access control system 100 in accordance with implementations of various techniques described herein. Access control system 100 includes an access device 105. Access device 105 may be a physical lock capable of being locked and unlocked electronically. Access device 105 may also be barrier system capable of being locked/unlocked and/or opened/closed. Access device 105 may be a part of a barrier system that includes access device 105 and a door, gate, turnstile, revolving door, security portal or any other barrier coupled to the access device 105. Access device 105 may include a near field communication (NFC) reader/terminal that is capable of handling EMVCo protocol messaging or some other form of RFID or proximity technology. Access control system 100 also includes a lock manager system, e.g., lock manager 115. Access device 105 communicates with lock manager 115 via a network 110. Network 110 may include a WIFI router and/or a mobile network, e.g., 3G, 4G, 5G and/or any other mobile network capable of handling communication between access device 105 and lock manager 115. Lock manager 115 may be administered locally (near where the access device is located) or externally (at a remote location) and provided by the party managing the access control system, e.g., a building/facility manager. Lock manager 115 secures communication to the access device(s) 105 through network 110. Lock manager 115 may also be referred to as an access manager or merchant system. In one implementation, Hypertext Transfer Protocol Secure/Transport Layer Security (HTTPS/TLS) secures communication among access device 105, access manager 115 and network 110.

Lock manager 115 is electronically/communicatively coupled to acquirer 130. Acquirer 130 may be electronically/communicatively coupled to payment processing entity 125. Payment processing entity 125 may be electronically/communicatively coupled to issuer entity 120. Payment processing entity 125 can also be referred to as a payment network entity.

In one implementation, a user attempts to unlock access device 105 using a payment card 135 or a payment card activated on a mobile device 140. If mobile device 140 is utilized, a user would open a mobile wallet on the mobile device 140 and select the card to be used to unlock access device 105. In some implementations, a biometric key and/or passcode is used to provide access to the mobile wallet on mobile device 140. Mobile device 140 may be a watch, key fob, wristband, wearable or any other payment capable device. The biometric passcode may be acquired using mobile device 140 or via biometric techniques described below in reference to FIG. 7.

Attempting to unlock access device 105 involves using the payment card 135 or the mobile device 140 to communicate payment card user information to access device 105. Communicating payment card user information may be accomplished by tapping the payment card 135 or mobile device 140 on the access device 105. Access device 105 includes a near field communication (NFC) reader/terminal configured to handle standard EMVCo payment protocol messaging.

In one implementation, EMV protocol includes dynamic data authentication to ensure that genuine payment cards and payment cards in mobile devices issued by a licensed card issuer of a payment scheme are accepted by the access device 105. In one implementation, payment cards and devices issued under other brands or technologies can be immediately ignored or rejected by the access device 105.

In one implementation, the EMVCo payment protocol can be implemented on a server—with the NFC reader acting as simply a radio interface to access device 105 with the processing logic handled in the server. The server can be implemented locally (on the premises and accessed by WIFI) or externally (in the cloud and accessed by a 3G/4G/5G modem).

Access device 105 transmits a request via network 110 to lock manager 115. In one implementation, the request includes payment data collected via the NFC reader within access device 105. In one implementation, the request is a zero value payment authorization request. Network 110 may be a WIFI router, a mobile network, e.g., 3G, 4G, 5G, or any other mobile network capable of communicating the request from access device 105 to lock manager 115. Access device 105 and lock manager 115 further include communication circuitry providing each with the ability to communicate with network 110.

In one implementation, instead of a zero value payment authorization request, the request may be a low-value payment authorization request, e.g., a request that includes an insignificant amount. For example, the low-value payment authorization request may include amounts more than zero and less than one dollar (or some other higher amount).

Lock manager 115 receives the request, e.g., the payment authorization request or zero value payment authorization request, to open access device 105. The lock manager 115 performs a lookup process using the card number of the payment card and determines whether the card number is eligible to open access device 105. Lock manager 115 includes a list of allowed tokens. The allowed tokens include permitted access days/times. If the card number is eligible, lock manager 115 forwards the payment authorization request to the acquirer 130. In one implementation, the acquirer 130 performs a payment authorization process based on the request and provides a payment authorization response based on the payment authorization process. The payment authorization process may contain authenticating cardholder information included with the request and/or validating tokens and/or a cryptogram associated with the cardholder information in the request. The payment authorization response may grant/open access, deny/block access or return an error message or some other message.

In one implementation, payment processing entity 125 is the entity that performs the payment authorization process instead of the acquirer 130. In this implementation, acquirer 130 forwards the payment authorization request (received from lock manager 115) to payment processing entity 125. In one implementation, the payment authorization request forwarded from the acquirer may be an ISO 8583 request including a cryptogram. When payment processing entity 125 receives the request, e.g., the payment authorization request or zero value payment authorization request, to open access device 105, the payment processing entity 125 performs a payment authorization process, e.g., validates the cryptogram, based on the request and provides a payment authorization response based on the payment authorization process. The payment authorization response may grant/open access, deny/block access or return an error message or some other message. Payment processing entity 125 pushes the payment authorization response to lock manager 115 through acquirer 130.

In one implementation, issuer entity 120 is the entity that performs the payment authorization process instead of the payment processing entity 125 or the acquirer 130. In this implementation, payment processing entity 125 forwards the payment authorization request (received via lock manager 115) to issuer entity 120. In one implementation, the payment authorization request forwarded from the payment processing entity 125 can be an ISO 8583 request including the cryptogram. The issuer entity 120 receives the request, e.g., the payment authorization request or zero value payment authorization request, to open access device 105. Upon receipt of the request, the issuer 120 performs the payment authorization process, e.g., validates the cryptogram, based on the request and provides a payment authorization response based on the payment authorization process. The payment authorization response may grant/open access, deny/block access or return an error message or some other message. Issuer entity 120 pushes the payment authorization response to lock manager 115 through payment processing entity 125 and acquirer 130. In one implementation, issuer entity 120 records the request and/or logs a transaction as a physical barrier access.

In one implementation, lock/access manager 115 sends the request directly to one or more of issuer entity 120, payment processing entity 125 and acquirer 130. In this implementation, issuer entity 120, payment processing entity 125 or acquirer, upon directly receiving the request from access manager 115, can perform the payment authorization process and provide the payment authorization response directly to access manager 115.

In one implementation, lock/access manager 115 may be coupled to one or more of issuer entity 120, payment processing entity 125 and acquirer 130 via cloud server 145. In this implementation issuer entity 120, payment processing entity 125 or acquirer is capable of receiving a request via access manager 115 via cloud server 145, performing the payment authorization process, and providing a payment authorization response to access manager 115 via cloud server 145.

Figure 10:
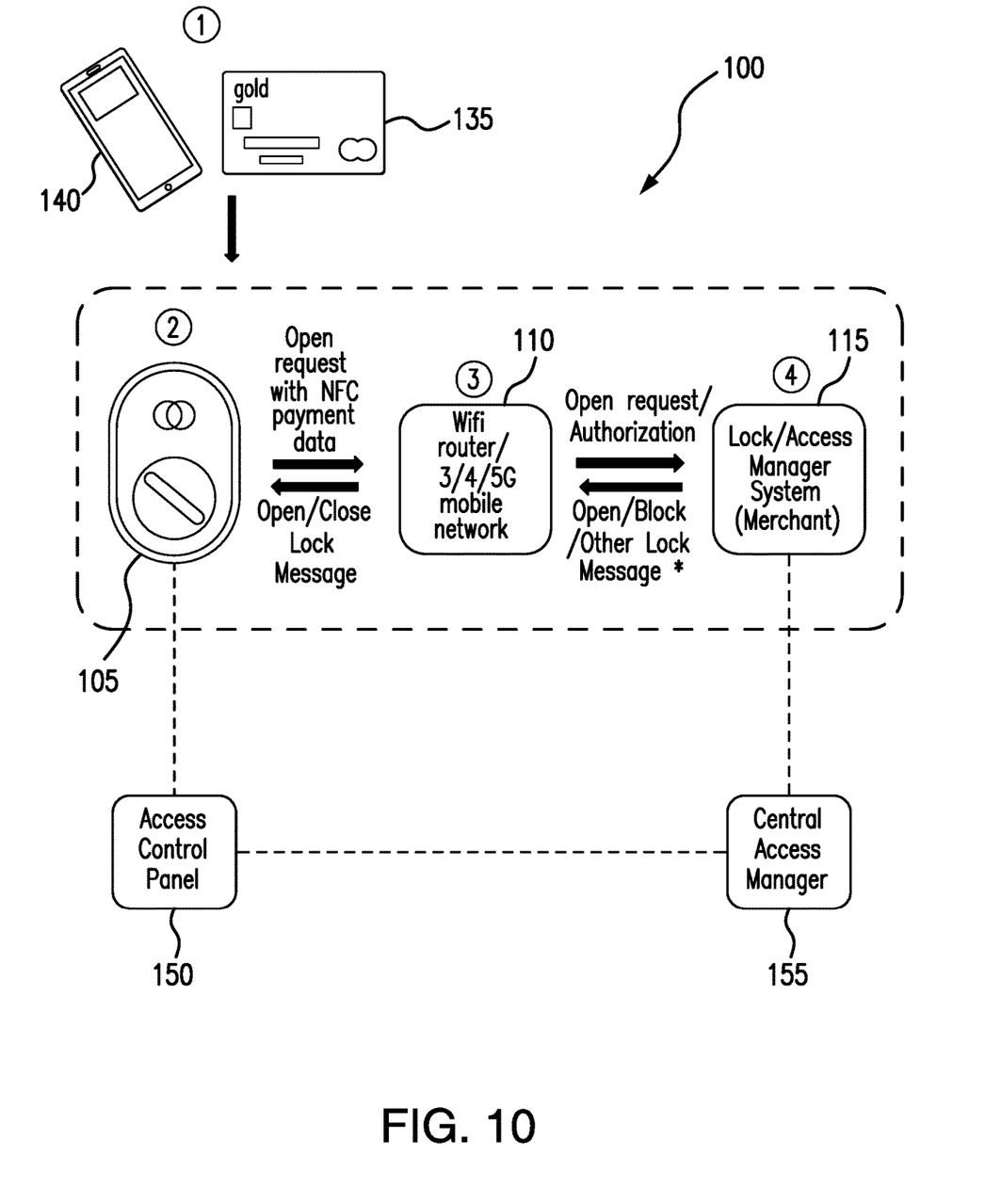
FIG. 10 illustrates an access control system in accordance with implementations of various techniques described herein.

FIG. 10 illustrates a partial view of access control system 100 with additional elements: access control panel 150 and central access manager 155. In one implementation, authorization control is provided via a distributed access control system, e.g., as shown in FIG. 10. The access control decision can be made by an intelligent access control panel 150 situated local to access device 105. The intelligent access control panel 150 is able to make access control decisions because the central access manager/access control system 155 distributes a full or partial copy of its database to the local panels. This architecture can offer performance benefits particularly where limited communications are available. This architecture also provides resilience benefits in the event of communications or power failures.

In one implementation, authorization control is provided by access control panel 150. Access control panel 150 receives a full or partial copy of a database of a central access manager 155. Access control panel 150 receives a payment authorization request from an access device 105. Access control panel 150 locally provides access based on user information provided in the payment authorization request and information provided in the received full or partial copy of the database.

In one implementation, the access control system 100 is a standalone system. In this implementation, access device 105 is offline and the payment card, e.g., payment card 135 or a payment card in a mobile wallet of mobile device 140, includes cryptographic data that provides access via access device 105. In other words, rather than relying on a central or distributed database to inform the access control decision, the credential carried by the user is pre-programmed with a cryptographically secured access privilege. When the credential interacts with the access device (e.g., a lock or other access control device), access privileges of the credential are communicated to access device 105. Access device 105 generates a payment authorization request to provide access control based on received user information, e.g., access privileges of the credential.

Access device 105 is able to cryptographically validate the credential and determine whether the credential is entitled to access the location controlled by access device 105. In one implementation, access device 105 can perform a lookup process based on the payment authorization request, determine eligibility for access based on the user information in the payment authorization request, and perform a payment authorization process based on the payment authorization request.

Access device 105 provides an offline verification of the cryptographic data and, e.g., generates a response to the payment authorization request. Access control is provided via access device 105 based on the response. Upon a successful verification of this cryptographic data access can be provided.

In one implementation, a backup unlock mechanism can be used to provide access via access device 105 in an event of a system failure. In one implementation the backup unlock mechanism can be a physical key.

Figure 2:
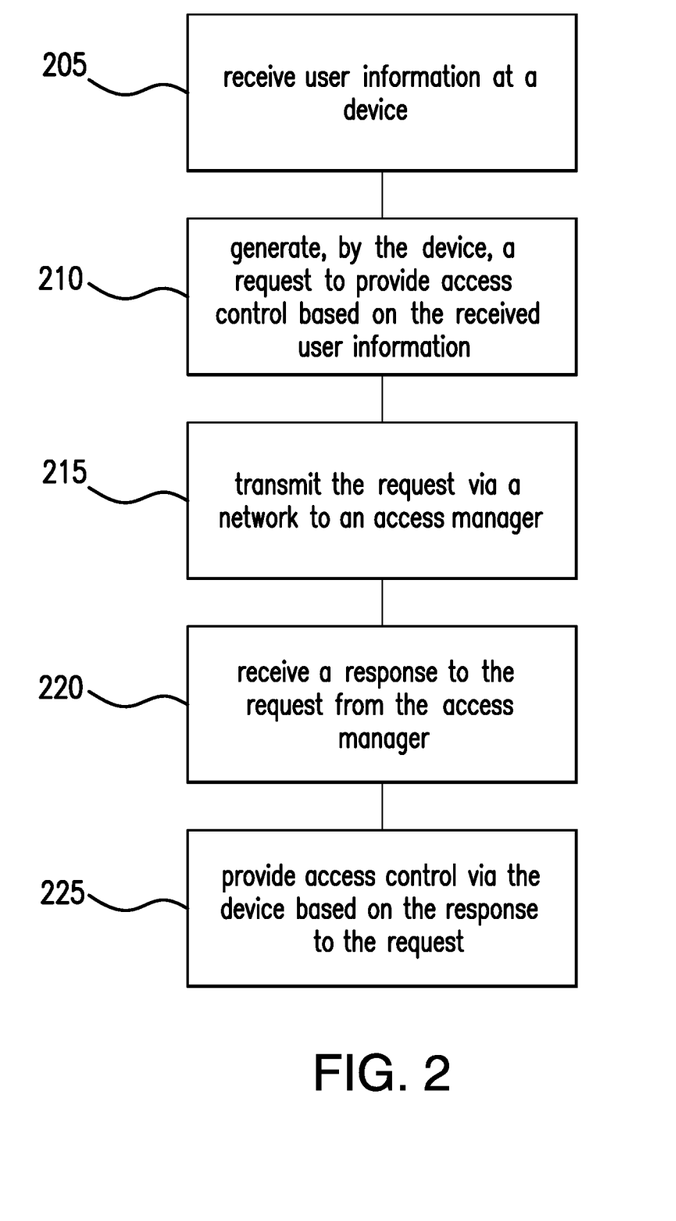
FIG. 2 illustrates a diagram of a method for providing an access control lock in accordance with implementations of various techniques described herein.

FIG. 2 illustrates a diagram of a method for providing an access control lock in accordance with implementations of various techniques described herein. At block 205, user information is received at a device. The user information may be received at the device, e.g., access device 105, via payment card 135, a payment card activated on a mobile device 140, or biometric information associated with a cardholder. The user information may include cardholder information and/or payment data, e.g., EMVCo protocol data. At block 210, a request to provide access control based on the received user information is generated by the device.

In one implementation, in a high-security environment, a 'transaction' would need to be completed by more than one payment account and/or device. In this implementation, once all criteria have been met for the transaction, physical and/or system access can be granted.

At block 215 the request is transmitted via a network, e.g., network 110, to an access manager, e.g., lock manager 115. The request may be transmitted via WIFI or any network or mobile network capable of handling communication between the access device and the access manager. In one implementation, the request is a payment authorization request or a zero value payment authorization request. A zero value payment authorization request can be utilized to validate a card number without holding funds At block 220, a response, e.g., a payment authorization response, to the request is received from the access manager. At block 225, access control is provided via the device based on the response to the request. The payment authorization response may grant access, deny access, or return an error message or some other message. If the payment authorization response grants access, a physical barrier is opened or unlocked. The physical barrier can be a door, gate, or some other type of entry/exit. The physical barrier can include a lock. Providing access control via the physical barrier may include locking or unlocking the lock. Providing access control may also include opening and/or closing the physical barrier.

Figure 3:
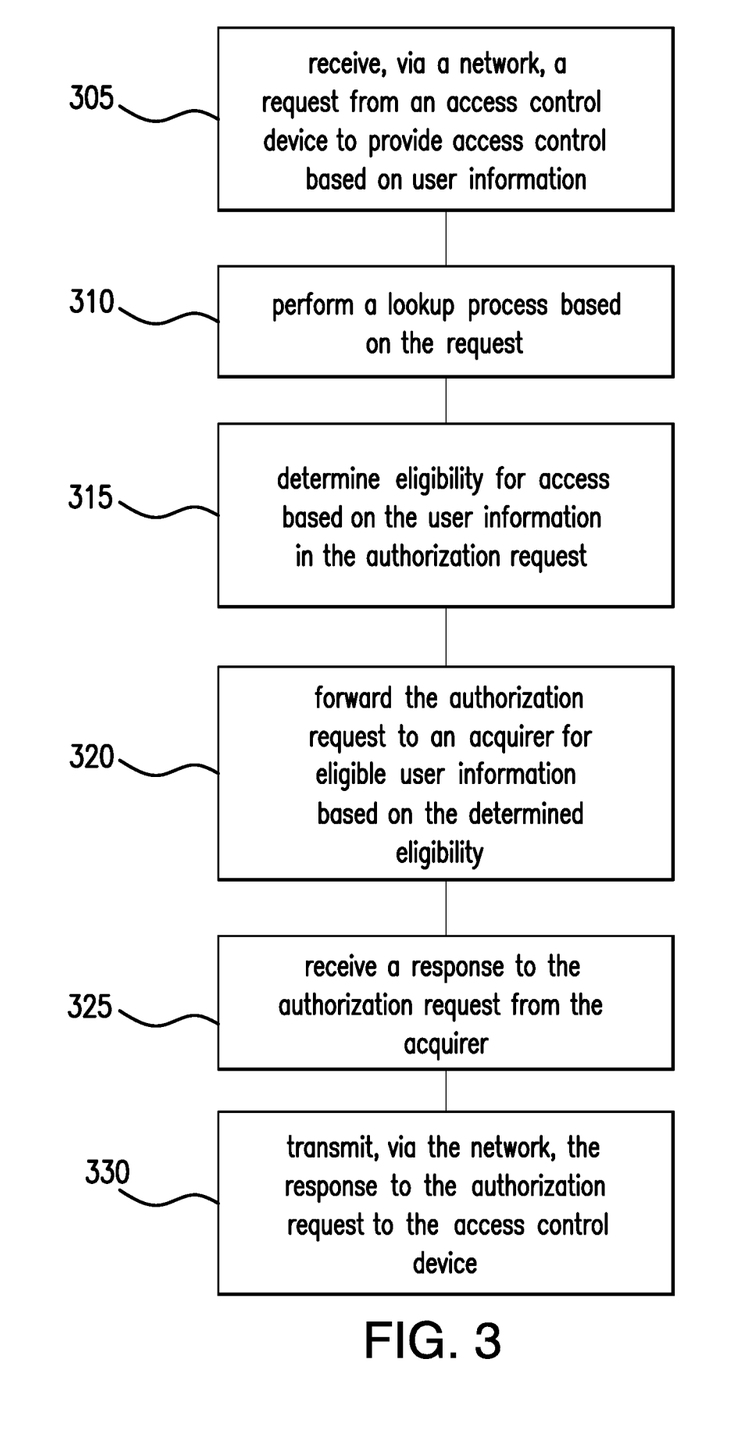
FIG. 3 illustrates a diagram of a method for providing a lock manager in accordance with implementations of various techniques described herein.

FIG. 3 illustrates a diagram of a method for providing an access manager, e.g., lock manager system 115, in accordance with implementations of various techniques described herein. At block 305 a request, e.g., a payment authorization request or zero value payment authorization request, from an access device to provide access control based on user information is received via a network, e.g., network 110.

At block 310, a lookup process is performed based on the request. At block 315, eligibility for access based on the user information in the request is determined. In one implementation, the user information may be a payment card number, a token, or any other information that can be used to determine eligibility for access.

At block 320, the request is forwarded to an acquirer 130 for eligible user information based on the determined eligibility. If the user information is eligible, lock manager 115 forwards the request to acquirer 130. In one implementation, lock manager 115 denies access for user information that is determined to be ineligible.

At block 325, a response to the request is received from the acquirer 130. At block 330, the response to the request is transmitted to the access device via the network. The response, e.g., a payment authorization response, may grant/ open access, deny/block access, or return an error message or some other message.

Figure 4:
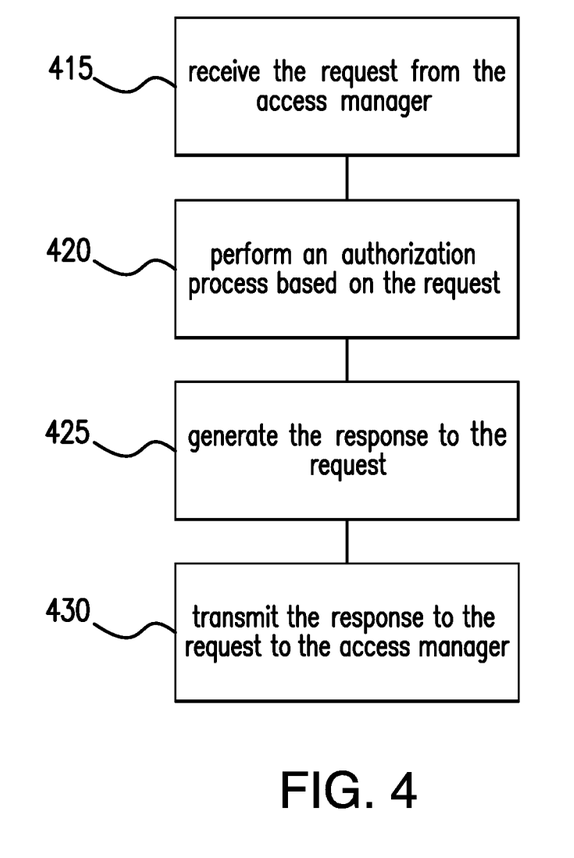
FIG. 4 illustrates a diagram of a method for payment authorization when performed by an acquirer in accordance with implementations of various techniques described herein.
Figure 5:
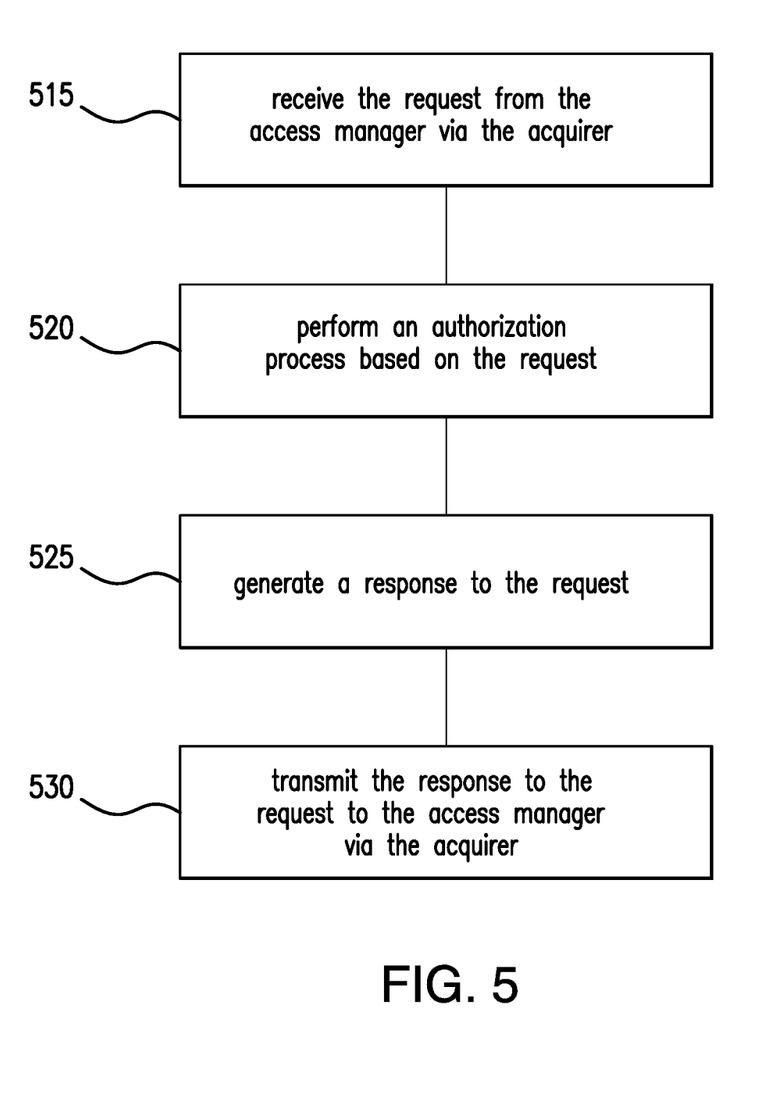
FIG. 5 illustrates a diagram of a method for payment authorization when performed by a payment processing entity in accordance with implementations of various techniques described herein.
Figure 6:
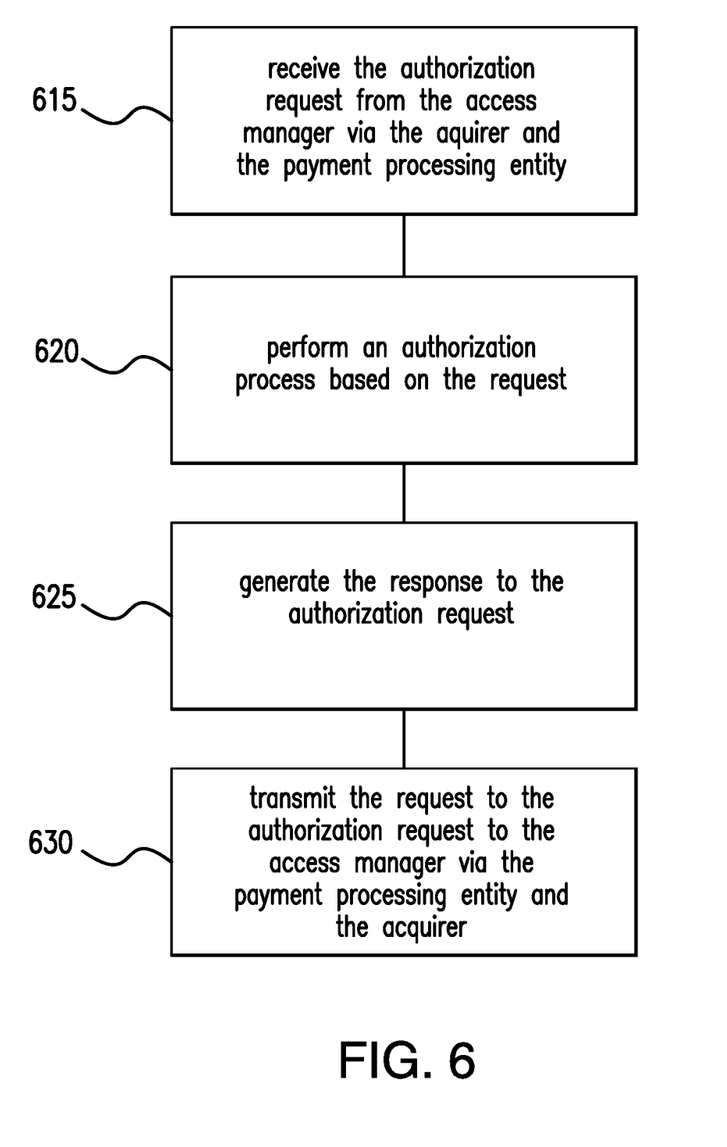
FIG. 6 illustrates a diagram of a method for payment authorization when performed by an issuer entity in accordance with implementations of various techniques described herein.

FIG. 4, FIG. 5 and FIG. 6 illustrate diagrams of methods for devices that are, or may optionally be, part of access control system 100. As described in reference to FIG. 1, access control system 100 includes at least access device 105, network 110, access manager 115 and acquirer 130. System 100 may optionally include payment processing entity 125, alone, or both issuer entity 120 and payment processing entity 125.

FIG. 4 illustrates a diagram of a method for payment authorization performed by an acquirer 130 in accordance with implementations of various techniques described herein. In this implementation, access device 105, network 110, access manager 115 and acquirer 130 are part of access control system 100. At block 415, acquirer 130 receives a request, e.g., a payment authorization request or zero value payment authorization request, from the access manager 115. At block 420, acquirer 130 performs a payment authorization process based on the request. In one implementation, acquirer 130 performs the payment authorization process by validating a received cryptogram using previously received keys, e.g., from issuer entity 120. In another implementation, acquirer uses public key cryptography to create the cryptogram and validates using the previously received keys. At block 425, acquirer 130 generates a response to the request. At block 430, acquirer 130 transmits the response to the request to the access manager 115.

FIG. 5 illustrates a diagram of a method for payment authorization when performed by a payment processing entity 125 in accordance with implementations of various techniques described herein. In this implementation, access device 105, network 110, access manager 115, payment processing entity 125, and acquirer 130 are part of access control system 100. At block 515, payment processing entity 125 receives a request, e.g., a payment authorization request or zero value payment authorization request, from the acquirer 130. At block 520, payment processing entity 125 performs a payment authorization process based on the request. In one implementation, the request includes a cryptogram and the payment authorization process includes validating the cryptogram.

In one implementation, the payment authorization process includes determining that token information is valid, e.g. for a payment card associated with a user. The token is looked up in a database and corresponding card record information is retrieved from a database. The cryptogram is generated using the token number. The authorization is performed by checking that the payment card is valid and/or in good standing. Upon a successful performance of this authorization request, the authorization request is approved. At block 525, payment processing entity 125 generates a response to the request.

At block 530, payment processing entity 125 transmits the response to the request to the access manager 115 via the acquirer 130. In one implementation, payment processing entity 125 transmits the response by pushing the response to access manager 115.

FIG. 6 illustrates a diagram of a method for payment authorization when performed by an issuer entity in accordance with implementations of various techniques described herein. In this implementation, access device 105, network 110, access manager 115, issuer entity 120, payment processing entity 125, and acquirer 130 are part of access control system 100. At block 615, issuer 120, receives a request, e.g., a payment authorization request or zero value payment authorization request, via the acquirer 130 and payment processing entity 125. At block 620, issuer entity 120 performs a payment authorization process based on the request. In one implementation, the request includes a cryptogram and the payment authorization process includes validating the cryptogram. In one implementation, the payment authorization process can be performed as described above in relation to element 520. At block 625, issuer entity 120 generates a response to the request.

At block 630, issuer entity transmits the response to the request to the access manager 115 via the acquirer 130 and payment processing entity 125. In one implementation, issuer 120 transmits the response by pushing the response to access manager 115. In one implementation, issuer entity 120 records the request and/or logs a transaction as a barrier access.

Figure 7:
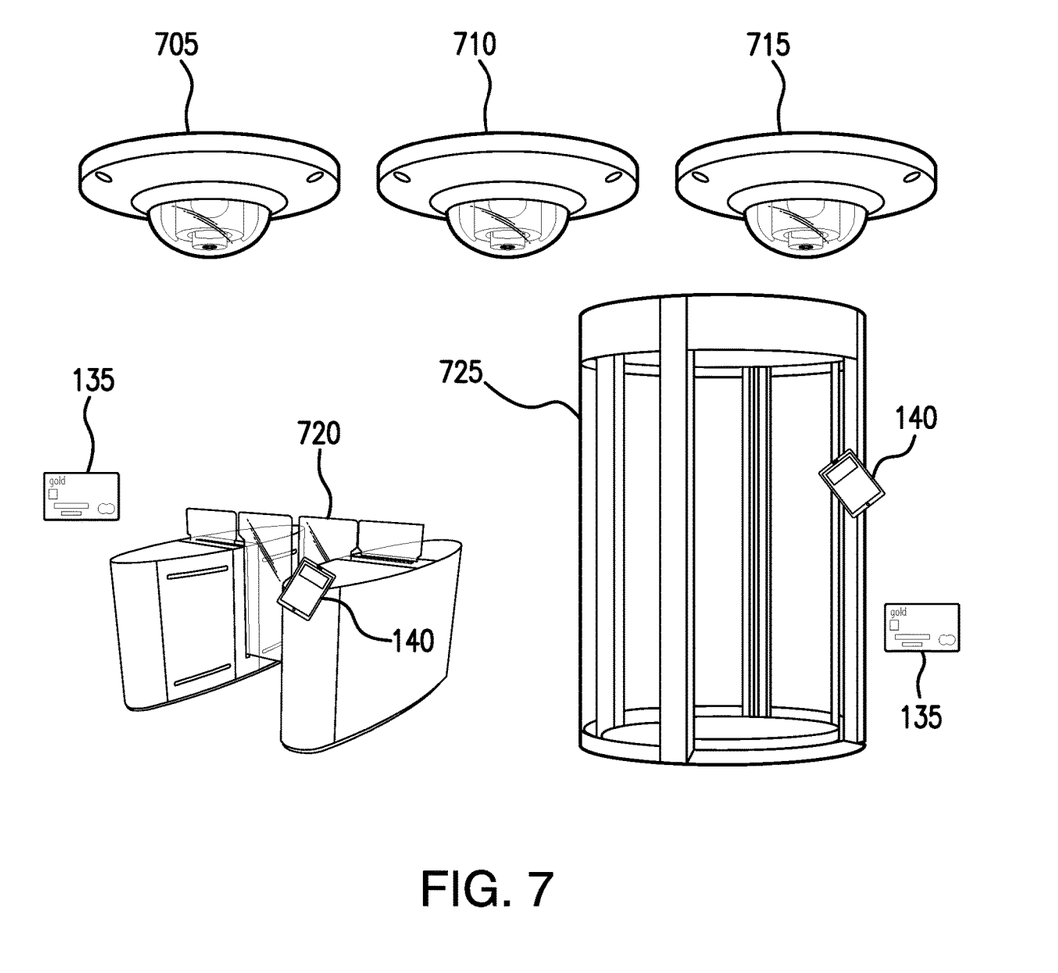
FIG. 7 illustrates barrier systems in accordance with implementations of various techniques described herein.

FIG. 7 illustrates barrier systems 705, 710, 715, 720, 725 in accordance with implementations of various techniques described herein. Although access control system 100 shows a lock as access device 105, e.g., for use in conjunction with a door, other barrier systems can be used in access control system 100. Other barrier systems utilizing access device 105 features, e.g., for opening/closing and locking/unlocking, are fare gate 720, security portal 725 and cameras 705, 710, 715. Payment card 135 or mobile device 140 may be used to access barrier systems 720, 725. In one implementation, airlock-style door systems can utilize access device 105 features for very high security environments. In such airlock-style door systems, declining access can result in an unauthorized person being trapped in the airlock. Cameras 705, 710, 715 may provide access using various biometric techniques, e.g., using image sensors and audio sensors.

In one implementation, a customer/location selling goods and/or services creates tokens that allow users to access a location and/or purchase goods and/or services. The customer/location registers the tokens on a merchant site/application. In one implementation, a user opens a digital wallet on a phone, e.g., mobile device 140, and selects the payment card from the digital wallet that is registered to access the customer/location. Access device 105, e.g., implemented within barrier systems 720, 725, can be used to provide access to the customer/location in accordance with the systems, devices and methods described in FIGS. 1-6. As described in FIGS. 1-6, a door/barrier can be opened/unlocked upon a successful authorization of a payment card, token, cryptogram and/or biometric information. In one implementation, a payment card used to access a customer/location may also be used for payment transactions.

In one implementation, the barrier can be a digital or virtual barrier. In this implementation, access device 105 may be a server or cloud server implementing a digital store. An access manager 115 may be a merchant associated with the digital store. In this implementation, access and/or payment to the digital store can be provided upon a successful authorization of a payment card, token, cryptogram and/or biometric information.

Figure 8:
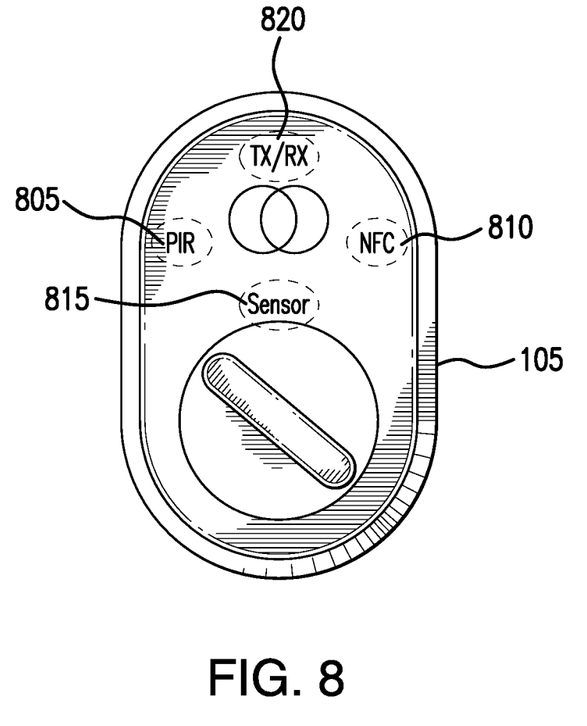
FIG. 8 illustrates an access device in accordance with implementation of various techniques described herein.

FIG. 8 illustrates an access device, e.g., access device 105, in accordance with implementations of various techniques described herein. In one implementation, access device 105 includes a sensor 805. Sensor 805 can be a passive infrared (PIR) sensor or other sensor, e.g., a human detection sensor or some other object detection sensor. Sensor 805 allows access device 105 to conserve power when not in use. In one implementation, sensor 805 can be powered via alternating current, battery, solar energy, or some other form of renewable energy. As described in reference to FIG. 1, various implementations of access device 105 may include a contactless reader, e.g., NFC 810. In addition, access device 105 includes communication hardware, e.g., transmitter/receiver 820, for communication via network 110.

In one implementation, access device 105 includes a sensor 815, e.g., a capacitive or other touch sensitive sensor, that detects when someone touches a handle of access device 105 without initiating a request for access. In one implementation, access device 105 can trigger an alarm and/or send a notification when an unauthorized touch is detected.

In one implementation, access manager 115 is capable of sending messages to an account holder to inform the account holder, e.g., the cardholder or token holder, of any event or attempt to access a system/location. In another implementation, access manager 115 is capable of updating access based on account holder messages.

In one implementation, access manager 115 may also use other systems (camera, sensors, etc.) to review an access status of a person trying to gain access.

In one implementation, access device 105 automatically detects when access device 105 remains in an open or unlocked state. Detection of the open or unlocked state can trigger an alarm or the sending of a notification.

In one implementation, the access device 105 is a lock that can be bought by a customer and fitted to a door or gate of a user. The user can set up an account on an application or website of the company providing access control via the access device. The lock can be linked to a company account. In one implementation, allowed payment cards or tokens can be taught to the access device 105. In another implementation, payment card numbers or tokens can be added via the website or application of the company. Other settings like dates and times of allowed access may also be configured via the company application/website.

Figure 9:
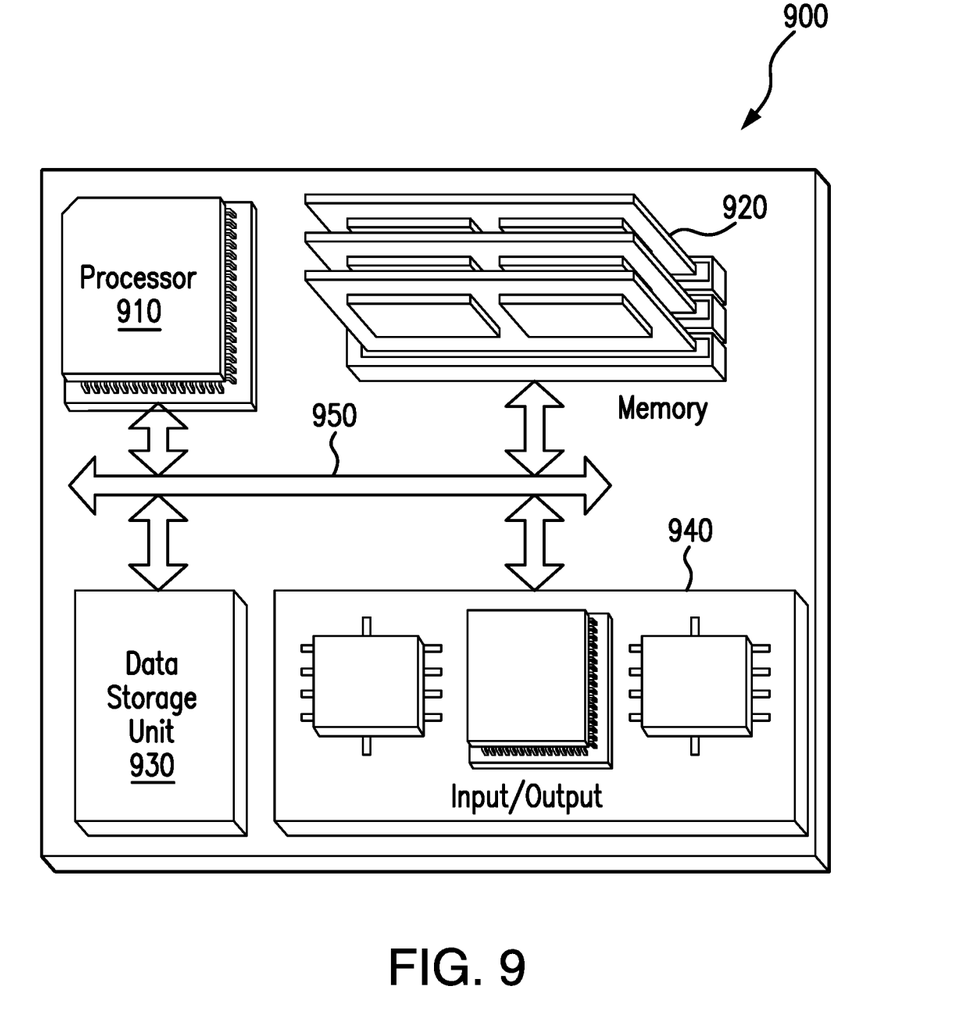
FIG. 9 illustrates a computing system in accordance with implementations of various techniques described herein.

FIG. 9 is a block diagram of a hardware configuration 900 operable as a device in an access control system 100. Hardware configuration 900 may be utilized to implement one or more of: an access device 105, one or more network devices 110, access manager 115, issuer entity 120, payment processing entity 125, acquirer or payment gateway 130, payment card 135, mobile device 140, access control panel 150, central access manager 155 and one or more barrier systems (e.g., cameras 705, 710, 715, fare gate 720, and security portal 725). The hardware configuration 900 can include a processor 910, a memory 920, a storage device 930, and an input/output device 940. Each of the components 910, 920, 930, and 940 can, for example, be interconnected using a system bus 950. The processor 910 can be capable of processing instructions for execution within the hardware configuration 900. In one implementation, the processor 910 can be a single-threaded processor. In another implementation, the processor 910 can be a multi-threaded processor. The processor 910 can be capable of processing instructions stored in the memory 920 or on the storage device 930.

The memory 920 can store information within the hardware configuration 900. In one implementation, the memory 920 can be a computer-readable medium. In one implementation, the memory 920 can be a volatile memory unit. In another implementation, the memory 920 can be a non-volatile memory unit.

In some implementations, the storage device 930 can be capable of providing mass storage for the hardware configuration 900. In one implementation, the storage device 930 can be a computer-readable medium. In various different implementations, the storage device 930 can, for example, include a hard disk device/drive, an optical disk device, flash memory or some other large capacity storage device. In other implementations, the storage device 930 can be a device external to the hardware configuration 900. The input/output device 940 provides input/output operations for the hardware configuration 900.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

The discussion above is directed to certain specific implementations. It is to be understood that the discussion above is only{XE "Narrowing designation: only" } for the purpose of enabling a person with ordinary skill in the art to make and use any subject matter defined now or later by the patent "claims" found in any issued patent herein.

It is specifically intended that the claimed invention{XE "Narrowing designation: invention" } not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical{XE "Narrowing designation: critical" } or essential{XE "Narrowing designation: essential" } to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only{XE "Narrowing designation: only" } used to distinguish one element from another. For example, a first object or step could be termed a second object or step, and, similarly, a second object or step could be termed a first object or step, without departing from the scope of the invention{XE "Narrowing designation: invention" }. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily{XE "Narrowing designation: necessarily" } limited to the specific features or acts described above. Rather, the specific features and acts described above are disclosed as example forms of implementing the claims.

What is claimed is:

1. A method, comprising:
receiving user information at a device;
generating, by the device, a request to provide access control and/or payment based on the received user information, the request comprising a payment authorization request;
transmitting the payment authorization request via a WIFI network to a locally administered access manager;
determining, by the locally administered access manager, an eligibility of a response via a lookup process based on the received user information, wherein the received user information comprises at least payment tokens, and wherein the locally administered access manager includes a listing of allowed payment tokens corresponding to one or more permitted dates and time intervals;
transmitting, by the locally administered access manager, the payment authorization request to an acquirer based on the determined eligibility of the response;
generating, by the acquirer, the response to the payment authorization request;
transmitting, by the acquirer, the response to the payment authorization request to the locally administered access manager;
receiving the response to the request via the WIFI network from the locally administered access manager; and
providing access control via the device based on the response to the payment authorization request.

2. The method of claim 1, wherein the locally administered access manager determines the response via the lookup process using the received user information.

3. The method of claim 2, wherein the payment authorization request comprises a zero-value or low-value payment authorization request.

4. The method of claim 1, wherein the user information comprises cardholder information received from a payment card.

5. The method of claim 1, wherein the user information comprises cardholder information received from a mobile device.

6. The method of claim 1, wherein the user information comprises biometric information associated with a cardholder.

7. The method of claim 1, wherein providing access control comprises locking and/or unlocking a barrier.

8. The method of claim 7, wherein the device comprises a lock coupled to the barrier.

9. The method of claim 7, wherein the barrier comprises a door or a gate.

10. The method of claim 1, wherein providing access control comprises opening and/or closing a barrier.

* * * * *